United States Patent [19]

Proctor et al.

[11] Patent Number: 5,844,326
[45] Date of Patent: Dec. 1, 1998

[54] MANAGED ELECTRICAL OUTLET FOR PROVIDING RANK-ORDERED OVER-CURRENT PROTECTION

[75] Inventors: Richard L. Proctor; Scott R. Schaper, both of Seattle, Wash.

[73] Assignee: Cruising Equipment Company, Inc., Seattle, Wash.

[21] Appl. No.: 881,715

[22] Filed: Jun. 23, 1997

[51] Int. Cl.$^6$ .................................................. H02J 4/00
[52] U.S. Cl. ............................ 307/34; 307/131; 361/93; 361/100
[58] Field of Search .................................. 307/125, 131, 307/139, 38, 39, 11, 12, 31, 32, 34; 361/93, 100; 327/175

[56] References Cited

U.S. PATENT DOCUMENTS

| | | | |
|---|---|---|---|
| 3,858,110 | 12/1974 | Breitmeier | 307/34 |
| 4,002,951 | 1/1977 | Halbeck . | |
| 4,010,431 | 3/1977 | Virani et al. . | |
| 4,013,929 | 3/1977 | Dietz et al. . | |
| 4,034,266 | 7/1977 | Virani et al. . | |
| 4,079,344 | 3/1978 | Lauben et al. . | |
| 4,135,101 | 1/1979 | Young et al. | 307/39 |
| 4,310,770 | 1/1982 | Keener et al. | 307/39 |
| 4,335,437 | 6/1982 | Wilson et al. . | |
| 4,336,462 | 6/1982 | Hedges et al. . | |
| 4,370,562 | 1/1983 | Palazzetti et al. | 307/38 |
| 4,370,723 | 1/1983 | Huffman et al. . | |
| 4,626,953 | 12/1986 | Nilssen | 361/63 |
| 4,687,948 | 8/1987 | Helt . | |
| 4,695,738 | 9/1987 | Wilmot . | |
| 4,872,081 | 10/1989 | Murphy et al. . | |
| 4,894,764 | 1/1990 | Meyer et al. . | |
| 4,915,162 | 4/1990 | Ikura | 307/34 |
| 4,977,515 | 12/1990 | Rudden et al. . | |
| 5,029,037 | 7/1991 | Bartelink . | |
| 5,117,178 | 5/1992 | Roth . | |
| 5,119,284 | 6/1992 | Fisher et al. | 307/34 |
| 5,142,646 | 8/1992 | Nachtigall . | |
| 5,157,273 | 10/1992 | Medendorp et al. | 307/147 |
| 5,270,578 | 12/1993 | Yamamura | 307/39 |
| 5,281,859 | 1/1994 | Crane . | |
| 5,323,307 | 6/1994 | Wolf et al. . | |
| 5,413,501 | 5/1995 | Munn . | |
| 5,451,755 | 9/1995 | Duval et al. . | |
| 5,455,760 | 10/1995 | Bilas et al. . | |
| 5,498,915 | 3/1996 | Crane | 307/139 |
| 5,500,561 | 3/1996 | Wilhelm . | |
| 5,541,457 | 7/1996 | Morrow . | |
| 5,544,036 | 8/1996 | Brown, Jr. et al. . | |
| 5,572,438 | 11/1996 | Ehlers et al. . | |
| 5,576,700 | 11/1996 | Davis et al. . | |
| 5,579,201 | 11/1996 | Karageozian . | |
| 5,581,132 | 12/1996 | Chadwick . | |

*Primary Examiner*—Jeffrey A. Gaffin
*Assistant Examiner*—Kim Huynh
*Attorney, Agent, or Firm*—Christensen, O'Connor, Johnson & Kindness, PLLC

[57] ABSTRACT

A managed electrical outlet includes a plurality of electrical receptacles, a current sensor, logic circuitry, a switch driver, and one or more switches. The electrical current provided to the managed electrical outlet is measured by the current sensor, which in turn sends an electrical signal to the logic circuit, representative of the amount of electrical current flowing through the outlet. The logic circuit compares the level of current flowing through the outlet with a reference current level to determine whether an over-current state exists. If the logic circuit determines the presence of an over-current state, the logic circuit sends a signal to the switch driver, causing the switch driver to trigger the switch into an open-circuit condition. In a two-receptacle outlet, one of the two receptacles is coupled to the switch while the other receptacle is unmanaged. Thus, in an over-current condition, current continues to be provided to the unmanaged receptacle while the managed receptacle (connected to the switch) is disabled.

19 Claims, 4 Drawing Sheets

MANAGED ELECTRICAL OUTLET FOR PROVIDING RANK-ORDERED OVER-CURRENT PROTECTION

FIELD OF THE INVENTION

The present invention relates to electrical outlets and, more particularly, to a managed electrical outlet for providing rank-ordered over-current protection.

BACKGROUND OF THE INVENTION

Power distribution systems typically distribute electrical power among a plurality of loads. For example, a standard duplex wall outlet distributes electrical power to each of the appliances that are connected to the outlet receptacles. In a typical building, several standard duplex electrical outlets are connected in parallel in a single electrical branch circuit. The electrical power in the circuit is then distributed among the plurality of loads connected to the receptacles provided in the circuit.

Similarly, a detached electrical power strip may be connected to one or more of the receptacles in a standard wall outlet. A typical power strip generally comprises an elongate housing having a row of plug-receiving receptacles that may be connected to a plurality of loads. The power strip therefore introduces a number of additional receptacles in parallel in the branch circuit.

The operation of a plurality of loads in a single electrical circuit can frequently lead to an over-current condition. If the loads cause an over-current condition, a circuit breaker contained in a remotely-located panel is tripped, causing an open circuit in the associated branch. Alternatively, a duplex power outlet or a remotely-located panel may include fuses that will stop the flow of electrical current when an over-current condition is reached. Similarly, many power strips include circuit breakers or surge-suppression circuitry to provide protection from over-current conditions.

Although certain existing devices address the issue of over-current protection, the available solutions are less than ideal. In virtually every case, circuit breakers must be reset or fuses replaced. When the fuses or circuit breakers are located in a position that is distant from the electrical outlet, replacing the fuse or resetting the circuit breaker may pose a significant inconvenience. This problem is compounded if the over-current condition recurs frequently or if there are no readily available fuses to replace those that are spent.

In many situations, there is no need to operate all of the appliances connected to the circuit simultaneously. If a certain combination of appliances produces an over-current condition, it might be preferable to turn one or more of the appliances off while one or more of the other appliances is operating. A space heater is an example of an appliance having a high wattage but which may be interrupted without ill effects. If a blow dryer is used on the same circuit, or outlet, as a space heater, the circuit breaker protecting the circuit is almost certain to trip. It would be preferable to briefly disable the space heater while the blow dryer is operating, rather than allowing the over-current condition to blow a fuse or trip a circuit breaker. Other combinations of appliances likewise will typically include one or more appliances that could be briefly disrupted to avoid an annoying circuit breaker trip.

The present invention is directed to providing a managed electrical outlet that overcomes the above-mentioned problems.

SUMMARY OF THE INVENTION

In accordance with this invention, a managed electrical outlet is provided. The managed electrical outlet includes a plurality of electrical receptacles, a current sensor, logic circuitry, a switch driver, and one or more switches. The electrical current provided to the managed electrical outlet is measured by the current sensor, which in turn sends an electrical signal to the logic circuit, representative of the amount of electrical current flowing through the outlet. The logic circuit compares the level of current flowing through the outlet with a reference current level to determine whether an over-current state exists. If the logic circuit determines the presence of an over-current state, the logic circuit will send a signal to the switch driver, causing the switch driver to trigger the switch into an open-circuit condition.

In accordance with other aspects of this invention, at least one of the plurality of electrical receptacles is unmanaged, and active at all times. The unmanaged outlet may only be disabled by a circuit breaker or other device providing protection for the entire circuit.

In accordance with further aspects of this invention, the reference current level is adjustable, allowing the adjustment of the point at which an over-current state is reached.

In accordance with still other aspects of this invention, a single managed electrical outlet may be connected to additional, standard electrical outlets on the same circuit with the managed electrical outlet. By separately coupling the managed receptacle of the managed electrical outlet to one or more standard, separated receptacles, and coupling the unmanaged receptacle of the managed electrical outlet to the remaining standard receptacles, a single managed electrical outlet will produce a plurality of managed receptacles and a plurality of unmanaged receptacles on a single circuit.

In accordance with yet other aspects of this invention, the managed electrical outlet may be constructed within a housing and configured to be plugged into a receptacle of standard duplex outlet, converting the standard duplex outlet into a managed electrical outlet.

In accordance with yet further aspects of this invention, in an alternate embodiment of this invention, the managed electrical outlet may include more than two receptacles, such as in a power strip. In this embodiment, one receptacle remains unmanaged. The remaining receptacles are managed on a ranked, priority basis. When the logic circuit determines the presence of an over-current state, it will direct the switch driver to disable as many loads as necessary, according to the priority ranking, to allow the outlet to operate within the established current limits.

In accordance yet further aspects of this invention, one or more of the managed receptacles includes a duty-cycle method for reducing power consumption. This duty-cycle controlled receptacle is useful for resistive loads, such as space heaters, that may receive reduced power levels on a partial-cycle basis without ill effects.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
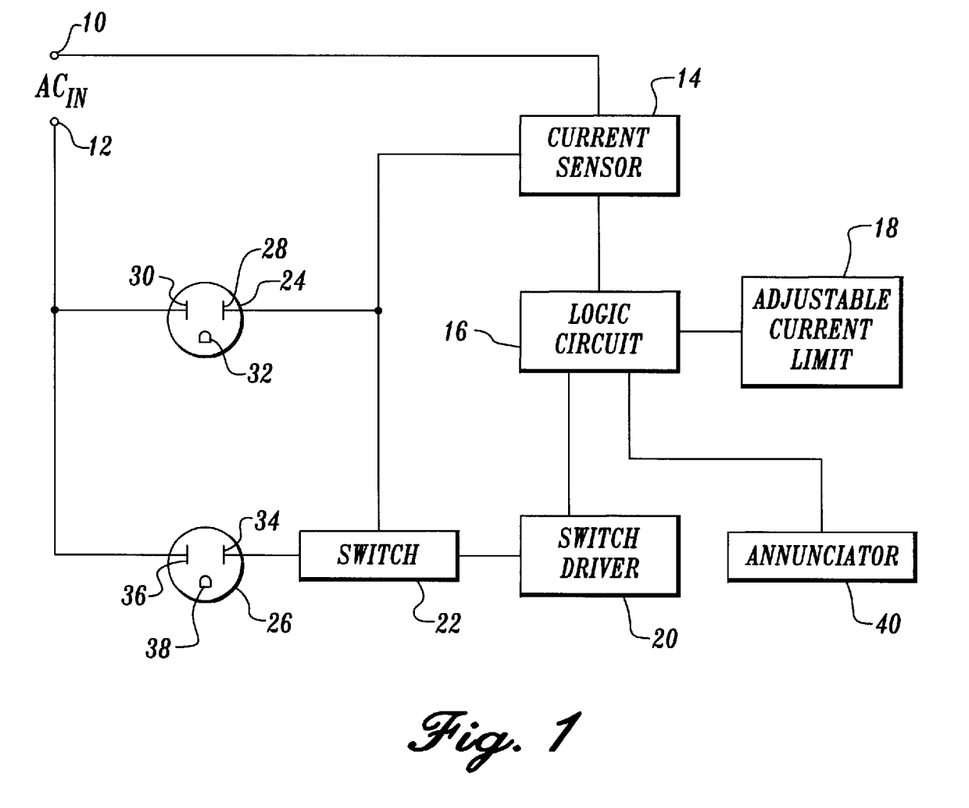
FIG. 1 is a block diagram of a managed electrical outlet formed in accordance with this invention.

FIG. 1 is a block diagram of a managed electrical outlet formed in accordance with this invention. As will be better understood from the following description, the managed electrical outlet is configured to disable one or more electrical receptacles in response to an over-current state. The managed electrical outlet includes first and second input terminals 10, 12, a current sensor 14, a logic circuit 16, a switch driver 20, a switch 22, and a pair of receptacles 24, 26.

Electrical power from a power source is applied across the input terminals 10, 12. The first terminal 10 is coupled to the current sensor 14, which senses, or measures, the total amount of current flowing through the receptacles 24, 26 and the loads connected to the receptacles 24, 26. The current sensor 14 can include a resistive shunt between the first terminal 10 and the receptacles 24, 26. By measuring the voltage drop across the resistive shunt, the current flow can be calculated. Other means may also be used for the current sensor 14. For example, a toroid may be coupled between the first terminal 10 and the receptacles 24, 26. Current flowing through the outlet will induce current to flow through the toroid. By measuring the voltage drop across a resistor connected to the toroid, the current flowing through the toroid, and the outlet, may be calculated. Regardless of the current sensing means used, the current sensor 14 provides an output signal that is representative of the total amount of current flowing through the managed electrical outlet. The output signal from the current sensor can be provided in either analog or digital form. Although the current sensor 14 has been described as being coupled between the first terminal 10 and the receptacles 24, 26, those skilled in the art will recognize that it may alternatively be coupled between the second terminal 12 and the receptacles 24, 26.

The output from the current sensor 14 is coupled to the input of the logic circuit 16. The logic circuit 16 compares the sensed current level with a reference current level to determine whether the managed electrical outlet is in an over-current state. The logic circuit can include a simple analog comparator. Alternatively, the logic circuit can include a digital microprocessor coupled to a memory device containing instructions for a control algorithm that is executed by the microprocessor. In either case, the logic circuit 16 compares the sensed current level with the reference current level to determine whether an over-current state exists. The reference current level can either be preset and included within the logic circuitry or can be an adjustable current limit 18 that may be modified and provided as an input to the logic circuit 16. The adjustable current limit 18 can include a potentiometer, dip switches, or other devices that are well-known in the art.

The output of the logic circuit 16 is coupled to the switch driver 20. In the event an over-current state exists, the logic circuit 16 sends a signal to the switch driver 20, causing the switch driver 20, in turn, to drive the switch 22 to an open-circuit position. Preferably, the switch 22 is a relay, although other devices may also be used for the switch 22. When the switch 22 is in an open-circuit position, current is not able to flow between the first terminal 10 and the managed receptacle 26. Thus, any load connected to the managed receptacle 26 will be disabled.

In the circuit illustrated in FIG. 1, two electrical receptacles are shown. The unmanaged receptacle 24 includes a pair of terminals 28, 30 configured to receive a plug from an appliance or other load, and can optionally include a ground terminal 32. As illustrated in FIG. 1, electrical current flows directly from the first terminal 10 through the current sensor 14, the unmanaged receptacle 24, the load connected to the receptacle (not shown), to the second terminal 12. Thus, the unmanaged receptacle 24 remains active at all times unless disrupted by a circuit breaker, fuse, or other device external to the outlet. The managed receptacle 26 is similar to the unmanaged receptacle 24 in that it includes a pair of terminals 34, 36 configured to receive a plug from an appliance or other load. In addition, the managed receptacle 26 can include a ground terminal 38. As discussed previously, however, the managed receptacle 26 can only provide electrical current to a load when the switch 22 is in the closed position. Accordingly, in an over-current condition, the unmanaged receptacle 24 remains active while the managed receptacle 26 is disabled.

An optional annunciator 40 is coupled to the logic current 16 to provide an indication of whether the managed outlet is enabled or disabled. The annunciator 40 is preferably a light-emitting diode (LED), but may alternatively be any visible or audible device. When the managed receptacle 34 is enabled, the logic circuit provides a signal to the annunciator 40 to light the LED. Conversely, when the managed receptacle 34 is disabled, the LED is off. While the annunciator 40 is preferably connected to the logic circuit 16, it may alternatively be connected, for example, to the output of the switch driver 20 or the switch 22.

Figure 2:
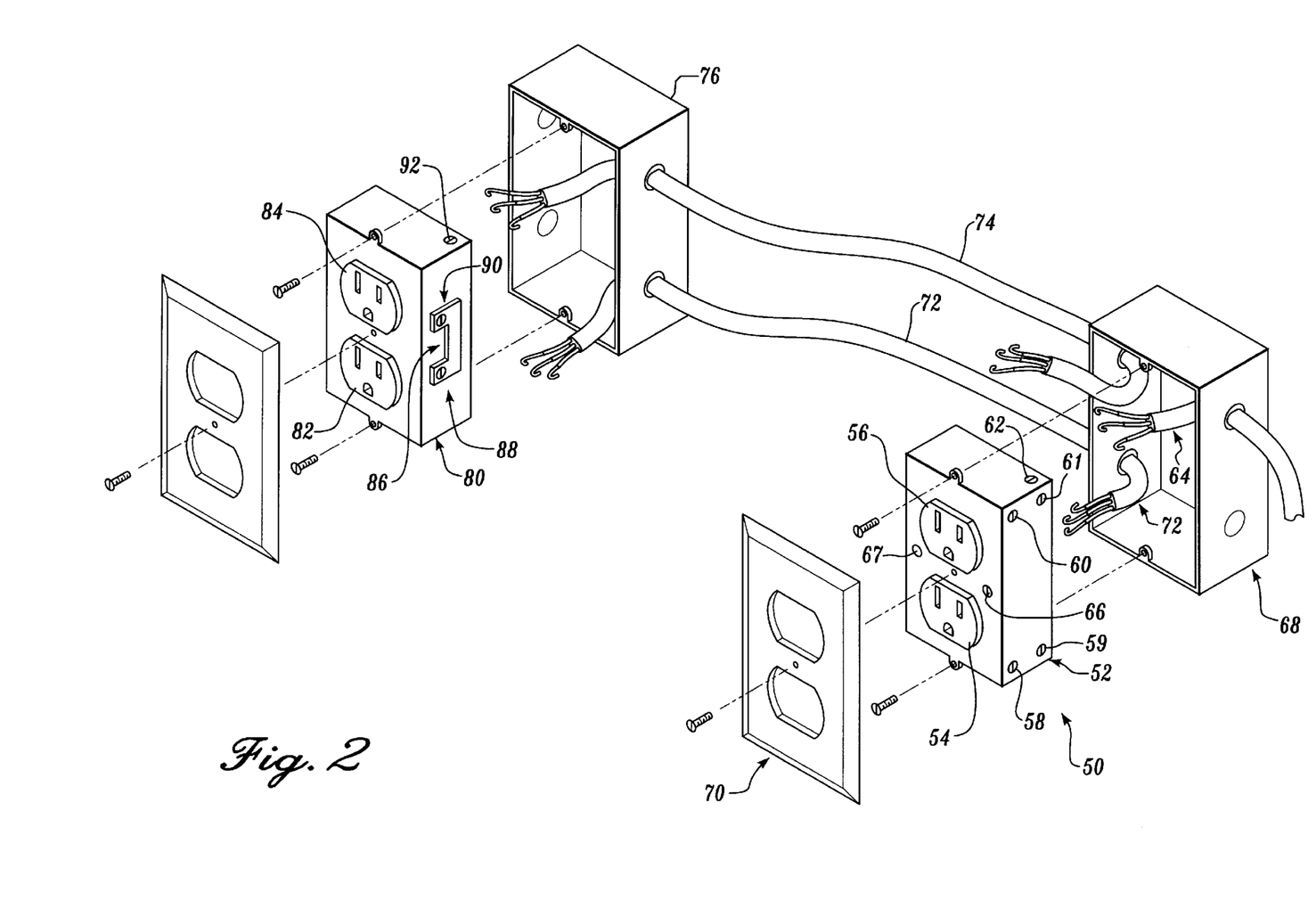
FIG. 2 is a perspective view of a managed electrical outlet formed in accordance with this invention and connected to a standard duplex wall outlet.

FIG. 2 shows a perspective view of a managed electrical outlet formed in accordance with this invention. The outlet 50 is constructed to fit within a standard junction box 68 and to receive a standard cover plate 70. Consequently, in the embodiment shown in FIG. 2, the managed electrical outlet 50 may replace or serve as a substitute for a standard duplex outlet. The circuitry illustrated in the block diagram of FIG. 1 is constructed to be retained within a housing 52. The managed receptacle 54 and unmanaged receptacle 56 protrude from one side of the housing 52 and are configured to be received within the openings of the cover plate 70.

The housing 52 includes a pair of terminals 60, 61 (corresponding to the terminals 10, 12 illustrated in FIG. 1). A ground terminal 62 is also provided on the housing 52. The appropriate wires from a first standard three-wire electrical cable 64 are connected to the terminals 60, 61 and ground terminal 62. As illustrated in FIG. 2, the terminals 60, 61 and ground terminal 62 include screws that may be loosened or tightened to receive the wires from the power cable 64. Those skilled in the art will appreciate that other methods may be used to connect the wires from the first power cable 64 to the managed electrical outlet 50. Similarly, the terminals 60–62 may be located in positions other than on the side of the housing 52, as shown.

The housing 52 also includes an annunciator 67 and an external control 66 for adjusting the adjustable current limit of the managed electrical outlet. As illustrated in FIG. 2, the control 66 includes a potentiometer that may be adjusted using a screwdriver. Those skilled in the art will recognize that other means may be used to provide an adjustable current limit consistent with the present invention. In addition, the control 66 is illustrated as being inaccessible without removing the cover plate 70. Likewise, the annunciator (preferably an LED) is not visible behind the standard cover plate 70. Those skilled in the art will further recognize that a custom cover plate may be provided with holes or other means to allow access to the control 66 and viewing of the annunciator 67 without removing the cover plate 70.

In the embodiment illustrated in FIG. 2, the managed electrical outlet also includes a first pair of output terminals 58, 59 and a second pair of output terminals (not shown). The first and second pairs of output terminals allow the managed outlet 50 to be used to convert all other outlets on the same circuit with the managed outlet 50 into managed outlets. The first pair of output terminals 58, 59 are coupled to the terminals of the managed receptacle 54. The appropriate wires from a first end of a second electrical power cable 72 are connected to the first pair of output terminals 58, 59, while the ground wire is connected to the ground terminal 62. The second end of the second power cable 72 is received within a second junction box 76 that may be located, for example, on an adjacent wall or in another room.

Similarly, a second pair of output terminals (not shown) are coupled to the terminals of the unmanaged receptacle 56. The appropriate wires of a first end of a third power cable 74 are connected to the second output terminals. The second end of the third power cable 74 is received within the second junction box 76 where it may be connected to a standard duplex wall outlet 80 having an upper receptacle 84 and a lower receptacle 82. The standard duplex wall outlet 80 includes a first pair of terminals 88, 90 joined by a first breakaway tab 86. The standard duplex wall outlet also includes a ground terminal 92 and at least one second terminal (not shown) that may comprise a second pair of terminals joined by a second breakaway tab. By breaking the first breakaway tab 86, and the second breakaway tab if present, the receptacles of the standard duplex outlet 80 will operate independently of one another. Thus, when the appropriate wires from the second power cable 72 connected to the managed receptacle 54 are connected to the lower receptacle 82, the lower receptacle 82 will operate in the same fashion as the managed receptacle 54 of the managed electrical outlet. Likewise, when the appropriate wires from the third power cable 74 are connected to the terminals associated with the upper receptacle 84, the upper receptacle 84 will operate as an unmanaged receptacle, as with the unmanaged receptacle 56 of the managed electrical outlet 50.

Although the second and third electrical power cables 72, 74 are shown as standard 3-wire cables, either one of the cables 72, 74 may comprise a single wire to produce a managed outlet system as depicted in FIG. 2. The receptacles of the standard outlet 80 may share the inputs from the ground and neutral wires from either one of the cables 72, 74. Consequently only a single "hot" wire is required for the other one of the cables 72, 74.

Any number of standard duplex outlets may be connected in parallel with the managed electrical outlet 50 to form a managed outlet system. As long as the managed electrical outlet 50 is the first outlet in the series, the current sensor 14 will sense the current flowing through all of the receptacles in the entire circuit. When the current exceeds the adjustable current limit, each of the managed receptacles in the circuit will be disabled. Each of the unmanaged receptacles, on the other hand, will remain active. Preferably, each of the upper receptacles is unmanaged while the lower receptacles are managed, although any combination of receptacles in the circuit may be configured as managed and unmanaged receptacles. Assuming there is a circuit breaker associated with the circuit, the circuit breaker will trip only if the loads connected to the unmanaged receptacles produce an over-current state.

Figure 3A:
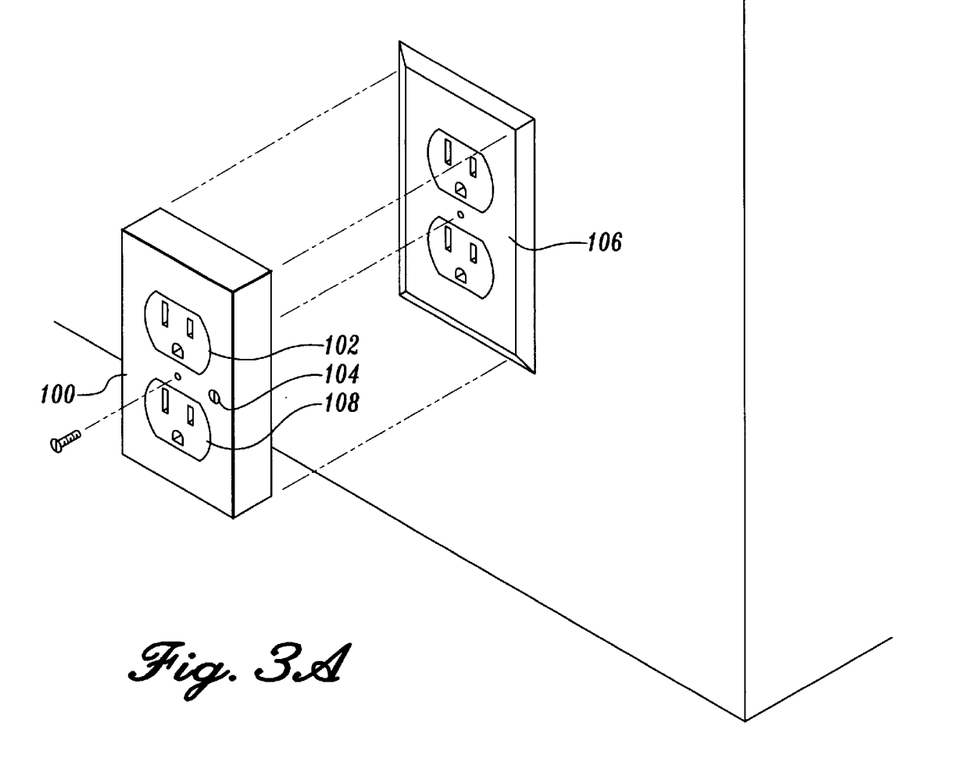
FIG. 3A is a perspective view of an alternate embodiment of a managed electrical outlet formed in accordance with this invention.
Figure 3B:
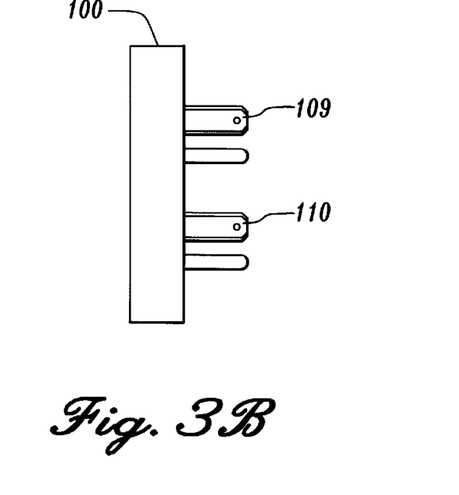
FIG. 3B is a plan view of an alternate embodiment of a managed electrical outlet formed in accordance with this invention.

An alternate embodiment of the present invention is illustrated in FIG. 3A. In this embodiment, the circuit illustrated in FIG. 1 is retained within a housing 100 that is connectable to a standard duplex wall outlet. In the arrangement of FIG. 3A, an unmanaged receptacle 102, managed receptacle 108, and adjustable current limit control 104 are shown mounted for access on a front face of the housing 100. With reference to FIG. 3B, a first and second set of male electrical connectors 109, 110 project from the back of the housing 100. Each set of connectors comprises two or more prongs configured to be connectable to a standard electrical receptacle. Either one or both of the sets of electrical connectors 109, 110 may be actively electrically connected to provide the input power source, $AC_{IN}$, as illustrated in FIG. 1. In the preferred embodiment, two pairs of electrical connectors are provided to ensure that the housing 100 remains more securely fastened to the standard wall outlet 106. Nevertheless, those skilled in the art will recognize that only one of the pair of electrical connectors 109, 110 is required for the managed electrical outlet to function properly.

Figure 4:
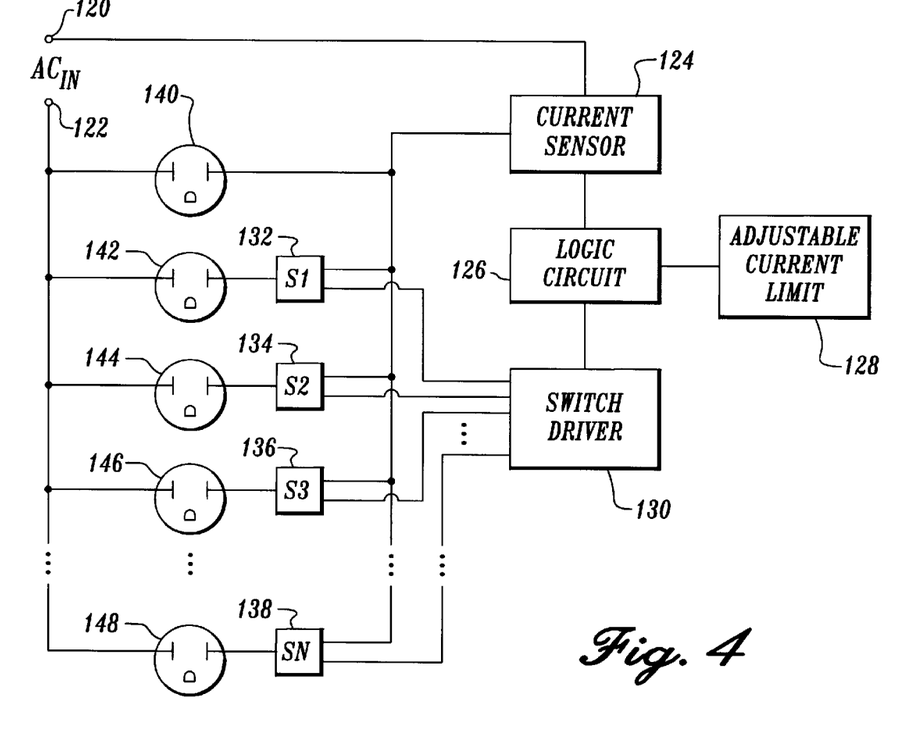
FIG. 4 is a block diagram of a managed electrical outlet having more than two receptacles, formed in accordance with this invention.

Although an outlet having two receptacles has been described and illustrated in FIGS. 1–3, those skilled in the art will recognize that an outlet having any number of receptacles may be used consistent with the present invention. Referring to FIG. 4, a block diagram for an outlet having a plurality of receptacles 140, 142, 144, 146, . . . 148 is shown. The managed electrical outlet of FIG. 4 operates in the same manner as the managed electrical outlet of FIGS. 1–3. Thus, electrical power from an AC power source is applied across a pair of terminals 120, 122. One terminal 120 of the pair of terminals 120, 122 is coupled to a current sensor 124, which in turn is coupled to an unmanaged receptacle 140. Thus, the unmanaged receptacle 140 will remain active at all times and will only become disabled if a circuit breaker or fuse controlling the branch circuit is tripped or blown. Although only one unmanaged receptacle 140 is shown, any number of unmanaged receptacles may be used in combination with any number of managed receptacles, consistent with the present invention.

The current sensor 124 is also coupled to a logic circuit 126. The logic circuit 126 compares the sensed current level as determined by the current sensor 124 with either a preset current level or a level provided by an adjustable current limit 128 to determine whether an over-current condition exists.

In the two-receptacle embodiment illustrated in FIGS. 1–3, the logic circuit preferably comprises a simple analog comparator. The analog comparator compares the sensed current level with the adjustable current limit and sends a signal instructing the switch driver to open the switch, or relay, when an over-current state exists. Preferably, the logic circuit quickly reacts to an over-current condition to disable the managed receptacle before a circuit breaker associated with the managed electrical outlet may be tripped. Because the over-current condition would likely continue to exist as long as the loads connected to the managed and unmanaged receptacles are operating, the logic circuit preferably includes a time delay causing the logic circuit to wait before instructing the switch driver to close the switch associated with the managed receptacle.

When the managed electrical outlet includes more than two receptacles, as illustrated in FIG. 4, the logic circuit 126 is more complex. The logic circuit 126 is coupled to a switch driver 130 and instructs the switch driver 130 to open or close one or more switches 132, 134, 136, . . . 138 in response to an over-current condition. In this embodiment, the logic circuit preferably includes a microprocessor capable of responding to instructions stored in an associated memory. When the logic circuit 126 detects an over-current condition, the logic circuit 126 sends a signal to the switch driver 130 instructing the switch driver 130 to disable the lowest-ranking receptacle 148 by opening the switch 138 connected to the receptacle. If an over-current condition continues to exist or is subsequently detected, the logic circuit 126 instructs the switch driver 130 to disable additional receptacles on a ranked, priority basis. For example, in response to an over-current condition, receptacle 146 is disabled, followed by receptacle 144, and finally receptacle 142.

Those skilled in the art will recognize that the logic circuit 126 may vary greatly in the features it includes, consistent with this invention. For example, the logic circuit 126 may store in an associated memory the change in the current level sensed by the current sensor 124 when each of the individual managed receptacles 142, 144, 146, . . . 148 is disabled. On the basis of this information, the logic circuit 126 determines the amount of excess current that is demanded by the loads and instructs the switch driver to simultaneously disable (on a ranked priority basis) the number of receptacles required to eliminate the over-current condition. Similarly, when the over-current condition has been eliminated, the logic circuit 126 determines the number, if any, of managed receptacles 142, 144, 146, . . . 148 that may be enabled while operating within the adjustable current limit. Because the loads that may be connected to any given receptacle may also be unplugged and replaced by different loads, the logic circuit 126 will preferably continually update any stored information related to the expected current level drawn by each receptacle.

Figure 5:
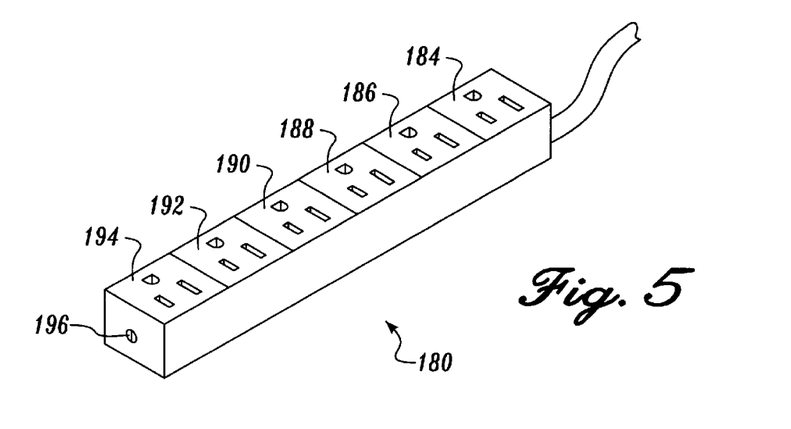
FIG. 5 is a perspective view of a managed electrical outlet having more than two receptacles, formed in accordance with this invention.

Referring to FIG. 5, a managed outlet having a plurality of receptacles according to this invention is shown and indicated generally by the reference numeral 180. The managed electrical outlet 180 is constructed as a standard 6-receptacle power strip configured to be plugged into an electrical receptacle, and includes an unmanaged receptacle 184 and five managed receptacles 186, 188, 190, 192, and 194. In response to an over-current condition, the managed receptacles 186–194 are disabled on a ranked priority basis. Thus, the lowest ranked receptacle 194 is first disabled, followed by the next lowest ranked receptacle 192 and each of the remaining receptacles 190, 188, 186, in order as necessary to eliminate the over-current state.

Any number of managed and unmanaged receptacles may be used in combination in a managed electrical outlet consistent with the present invention. In addition, while a multiple-receptacle managed outlet is illustrated in FIG. 5 as a power strip configured to be plugged into a standard receptacle, those skilled in the art will recognize that a managed outlet having more than two receptacles may be configured as a wall outlet of the type illustrated in FIG. 2, consistent with the present invention.

Figure 6:
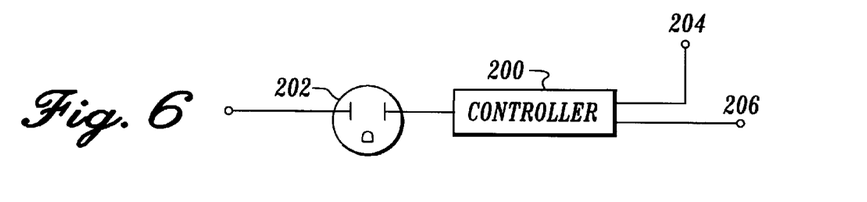
FIG. 6 is a block diagram of a duty-cycle controlled, reduced power receptacle, formed in accordance with this invention.

In many cases, when a managed receptacle is disabled in response to an over-current condition, a certain amount of circuit capacity is not available. For example, if the adjustable current limit is set at 15 amps and the current sensor senses a total load of 16 amps, the lowest-ranked receptacle will be disabled. But if the load at the lowest-ranked receptacle was consuming 4 amps, the entire outlet will now be consuming 12 amps, leaving 3 amps of capacity available but unused. With reference to FIG. 6, an alternate embodiment for the lowest-ranked managed receptacle is shown. In this embodiment, a controller 200 is connected to the receptacle 202 to control the duty cycle of the power consumed by a load connected to the receptacle 202. The controller includes a first input 204 taken from the output of a current sensor such as the current sensor 124 shown in FIG. 4 and previously discussed. The controller 200 also includes a second input 206 that is coupled to an output from a logic circuit. The logic circuit can be substantially the same as the logic circuit 126 illustrated in the embodiment of FIG. 4, and instructs the controller 200 to either allow or not allow current to flow through the receptacle 202. The controller 200 may include any of a variety of devices that can control the duty cycle of the current provided to the receptacle 202. For example, the controller may comprise a solid state switch capable of switching on and off on a half or partial cycle basis to reduce the total current flow. Alternatively, the controller 200 may comprise a silicon controlled rectifier (SCR) or other phase-controlled switching device capable of controlling duty cycle of the power delivered to the load.

A managed receptacle configured such as that illustrated in FIG. 6 may be particularly useful for resistive loads. For example, the power supplied to a space heater or a hot plate for a coffee pot may be temporarily reduced by adjusting the duty cycle of the current flow, without ill effects to the load. In this manner, the maximum power is provided to the loads connected to the managed receptacle while avoiding an over-current state.

A managed electrical outlet formed in accordance with the present invention offers many advantages over the prior art. Most importantly, one or more of the receptacles in the managed outlet may be disabled in the presence of an over-current condition, preventing the remote circuit breaker from being tripped. Consequently, over-current conditions are managed automatically, without requiring human intervention.

Additionally, the managed electrical outlet of the present invention may be used to replace a standard duplex wall outlet. If there are several outlets in a single circuit, the managed electrical outlet of the present invention may be used to convert all of the outlets in the same circuit into managed electrical outlets. This is accomplished by using the managed electrical outlet as the first outlet in the circuit, connecting a first receptacle from each of the standard outlets to the unmanaged receptacle from the managed electrical outlet, and connecting a second receptacle from each of the standard electrical outlets to the managed receptacle of the managed electrical outlet.

Still another advantage is provided by the use of a plurality of managed receptacles in the managed electrical outlet. Consistent with the present invention, any number of receptacles may be included in the managed electrical outlet. Likewise, the receptacles of the managed electrical outlet may be divided into any number of managed and any number of unmanaged receptacles.

Yet another advantage is provided by including a receptacle that may be supplied a reduced current level on a limited duty cycle basis. In this manner, a reduced power level may be supplied to the load coupled to that receptacle, allowing the loads to consume the entire available capacity.

This reduced power receptacle will be especially useful for resistive loads or other appliances that can tolerate reduced power levels without ill effects.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A managed electrical outlet for supplying electrical power to one or more loads, comprising:

a managed receptacle;

an unmanaged receptacle;

a pair of input terminals connected to provide power to the managed and unmanaged receptacles;

a current sensor coupled between either one of the pair of input terminals and the managed and unmanaged receptacles for sensing the total current magnitude flowing through the current sensor and consumed by the one or more loads connected to the managed receptacle and the unmanaged receptacle;

a logic circuit connected to the current sensor and configured to produce an output signal indicative of an over-current condition when the current magnitude sensed by the current sensor exceeds a reference current level; and a switch coupled to the managed receptacle and responsive to the signal from the logic circuit to disable the current flow through the managed receptacle.

2. The managed electrical outlet of claim 1, further comprising a switch driver coupled between the logic circuit and the switch.

3. The managed electrical outlet of claim 1, further comprising a means for indicating whether the managed receptacle is enabled or disabled.

4. The managed electrical outlet of claim 1, wherein the reference current level is an adjustable current level.

5. The managed electrical outlet of claim 1, further comprising an additional managed receptacle coupled to a controller, wherein the controller is responsive to a signal from the logic circuit to provide a reduced power level to a load connected to the additional managed receptacle.

6. The managed electrical outlet of claim 1, wherein the managed electrical outlet is contained within a housing and includes a set of two electrical connectors projecting from the housing connectable to a standard electrical receptacle.

7. The managed electrical outlet of claim 1, further comprising an additional managed receptacle in parallel with the managed receptacle and an additional switch connected between the logic circuit and the additional managed receptacle, wherein the additional switch is responsive to an additional signal from the logic circuit to disable the current flow through the additional managed receptacle.

8. The managed electrical outlet of claim 1, further comprising:

a plurality of managed receptacles; and a plurality of switches, each one of the plurality of switches being associated with a different one of the plurality of managed receptacles and responsive to a signal from the logic circuit to disable current flow through the associated managed receptacle.

9. The managed electrical outlet of claim 8, wherein the logic circuit includes a means for signaling the switches on a ranked priority basis in response to an over-current condition.

10. A managed electrical outlet for supplying electrical power to one or more loads, comprising:

a managed receptacle;

an unmanaged receptacle;

a pair of input terminals connected to provide power to the managed and unmanaged receptacles;

a means for sensing the magnitude of electrical current flowing between the input terminals and consumed by the one or more loads connected to the managed receptacle and the unmanaged receptacle;

a logic means, responsive to the sensing means, for comparing the magnitude of current consumed by the one or more loads connected to the managed receptacle and the unmanaged receptacle with a reference current level and producing an output signal indicative of an over-current condition when the sensed current magnitude exceeds the reference current level; and a means for disabling the current flow through the managed receptacle in response to the output signal from the logic means.

11. The managed electrical outlet of claim 10, wherein the reference current level is an adjustable current level.

12. The managed electrical outlet of claim 10, further comprising a means for indicating whether the managed receptacle is enabled or disabled.

13. The managed electrical outlet of claim 10, wherein the managed electrical outlet is contained within a housing and includes a set of electrical connectors projecting from the housing connectable to a standard electrical receptacle.

14. The managed electrical outlet of claim 10, further comprising:

a plurality of managed receptacles connected to receive power provided at the input terminals; and a plurality of disabling means, each one of the plurality of disabling means being associated with a different one of the plurality of managed receptacles and responsive to the logic means for disabling current flow through the associated managed receptacle.

15. The managed electrical outlet of claim 14, wherein the logic means includes a means for instructing the plurality of disabling means to disable the plurality of managed receptacles on a ranked priority basis.

16. The managed electrical outlet of claim 14, further comprising a controller means coupled to one of the plurality of managed receptacles for providing a reduced power level to the managed receptacle connected to the controller means.

17. A managed electrical outlet system for supplying electrical power to one or more loads, comprising:

a first outlet having a first receptacle and a second receptacle, wherein the first receptacle is an unmanaged receptacle and the second receptacle is a managed receptacle;

a pair of input terminals connected to provide power to the first and second receptacles;

a current sensor coupled between one terminal of the pair of input terminals and the first and second receptacles for sensing the total current magnitude flowing through the current sensor and consumed by the one or more loads connected to the first and second receptacles;

a logic circuit connected to the current sensor and configured to produce an output signal indicative of an over-current condition when the current magnitude sensed by the current sensor exceeds a reference current level;

a switch coupled to the second receptacle and responsive to the signal from the logic circuit to disable the current flow through the second receptacle; and a second outlet having a third receptacle and a fourth receptacle, wherein the third receptacle is connected to the first receptacle and the fourth receptacle is connected to the second receptacle.

18. The managed electrical outlet system of claim 17, wherein the reference current level is an adjustable current level.

19. The managed electrical outlet system of claim 17, further comprising one or more additional outlets having a pair of receptacles, wherein one of the pair of receptacles from each of the one or more additional receptacles is connected to the first receptacle and the other of the pair of receptacles from each of the one or more additional receptacles is connected to the second receptacle.

* * * * *